(12) United States Patent
Katoh

(10) Patent No.: US 7,310,328 B2
(45) Date of Patent: Dec. 18, 2007

(54) VOICE COMMUNICATION SYSTEM AND ITS METHOD

(75) Inventor: Noriyasu Katoh, Shinagawa-ku (JP)

(73) Assignee: Allied Telesis K.K., Tokyo (JP)

(*) Notice: Subject to any disclaimer, the term of this patent is extended or adjusted under 35 U.S.C. 154(b) by 1103 days.

(21) Appl. No.: 10/370,601

(22) Filed: Feb. 24, 2003

(65) Prior Publication Data

US 2004/0030785 A1   Feb. 12, 2004

(30) Foreign Application Priority Data

Aug. 7, 2002   (WO)  .................. PCT/JP02/08065

(51) Int. Cl.
*H04L 12/66*   (2006.01)
(52) U.S. Cl. ...................... 370/352; 370/401
(58) Field of Classification Search ................ 370/351, 370/352, 353, 356
See application file for complete search history.

(56) References Cited

U.S. PATENT DOCUMENTS

| | | | |
|---|---|---|---|
| 6,754,224 B1* | 6/2004 | Murphy ...................... | 370/432 |
| 6,826,174 B1* | 11/2004 | Erekson et al. ............. | 370/352 |
| 2001/0036174 A1* | 11/2001 | Herring ...................... | 370/352 |
| 2003/0227907 A1* | 12/2003 | Choi et al. .................. | 370/352 |

FOREIGN PATENT DOCUMENTS

| | | |
|---|---|---|
| JP | A 3-201758 | 9/1991 |
| JP | A 7-203043 | 8/1995 |
| JP | A 2000-59499 | 2/2000 |
| JP | A 2000-216875 | 8/2000 |
| JP | A 2000-324229 | 11/2000 |
| JP | A 2001-136272 | 5/2001 |
| JP | A 2001-333177 | 11/2001 |
| JP | A 2002-26987 | 1/2002 |
| JP | A 2002-77437 | 3/2002 |

OTHER PUBLICATIONS

"Denwaya ga Kaita IP no Hon", pp. 312-347.

* cited by examiner

*Primary Examiner*—Chau Nguyen
*Assistant Examiner*—Kenneth R Hartmann
(74) *Attorney, Agent, or Firm*—Steven J. Hultquist; Intellectual Property/Technology Law

(57) ABSTRACT

When there is an arrival of a multicast call at a VoIP terminal on a call reception side, an SLIC sends out a ringing signal to a loudspeaker IF. The loudspeaker IF, after receiving the ringing signal, enters into a state in which voice is outputted from a loudspeaker even if a user does not respond. Compressed voice data is taken out of an IP packet received from a network and extended by a DSP to become voice data. Further, the voice data is converted by a CODEC into a voice signal, which is outputted from the loudspeaker.

7 Claims, 6 Drawing Sheets

VOICE COMMUNICATION SYSTEM AND ITS METHOD

BACKGROUND OF INVENTION

1. Field of the Invention

The invention relates to a voice communication system for carrying out communication via a VoIP (Voice over Internet Protocol) system and its method.

2. Description of the Related Art

As disclosed in, for instance, "*Denwaya ga Kaita IP no Hon* (*A Book on IP Written by a Telephone Mechanic*), by Yoshikazu Kobayashi, RIC TELECOM Ltd., Mar. 20, 2002, ISBN4-89797-714-2 (Reference 1), pp. 312-347" and elsewhere, a system known as VoIP (Voice over Internet Protocol), by which voice communication is carried out by transmitting voice data encapsulated in an IP packet in a network, has been proposed in a recent year.

In this VoIP system, multicast calls that are initiated at a single terminal and addressed to many terminals at the same time are possibly carried out, as well as the one-to-one calls used for customary telephone communication.

Also, various telephone response systems are disclosed in, for instance, Japanese unexamined patent publications 2001-333177, 2001-136272, 2000-324229, 2001-216875, 2001-059499 and 2002-077437 (References 2 through 7).

However, none of these discloses a voice communication system that makes use of the multicast call feature of VoIP.

BRIEF DESCRIPTION OF THE INVENTION

An objective of the present invention, attempted in light of the above-noted deficiency, is to provide a voice communication system that makes good use of the multicast call feature of the VoIP system and its method.

[Voice Communication System]

In order to achieve the objective stated above, a voice communication system pertaining to the present invention is a voice communication system comprising a network and a plurality of voice communication apparatuses connected to the network, wherein each of the plurality of voice communication apparatuses performs first call request processing directed to one or more of the other voice communication apparatuses, or second call request processing directed to some of the other voice communication apparatuses; the network performs, in response to the first call request processing, first call reception processing for one or more of the other voice communication apparatuses or, in response to the second call request processing, second call reception processing for some of the other voice communication apparatuses, and transmits a voice signal from the voice communication apparatus on the call request side to each of the voice communication apparatuses having responded to the first call reception processing or the second call reception processing. Each of the voice communication apparatuses receiving the first call reception processing outputs the voice signal from the voice communication apparatus on the call request side when receiving the first call reception processing, and is notified of the call reception when receiving the second call reception processing and, after receiving a response to the call reception, outputs the voice signal from the voice communication apparatus 1 on the call request side.

[Voice Communication Apparatus]

Voice communication apparatuses pertaining to the invention are voice communication apparatuses connected to a network, wherein each of the voice communication apparatus performs first call request processing directed to one or more of the other voice communication apparatuses or second call request processing directed to some of the other voice communication apparatuses. The network, in response to the first call request processing, performs the first call reception processing for one or more of the other voice communication apparatuses, or in response to the second call request processing, it performs second call reception processing for some of the other voice communication apparatuses, and transmits a voice signal from the voice communication apparatus on the call request side to each of the voice communication apparatuses that responded to the first call reception processing or the second call reception processing. The voice communication apparatus is provided with a means for performing first call reception processing, in order to output the voice signal from the voice communication apparatus on the call request side when receiving the first call reception processing. The voice communication apparatus is also provided with a means for performing second call reception processing, for notification of call reception when receiving the second call reception processing, and after receiving a response to the call reception, outputting the voice signal from the voice communication apparatus on the call request side.

Preferably, the apparatus should have a packet processing means for accommodating voice data obtained by converting a voice signal into a prescribed packet, transmitting it via the network, and extracting the voice data from the prescribed packet transmitted via the network, a converting means for converting a voice signal into voice data and converting the voice data taken out of the prescribed packet into a voice signal, a voice output means for outputting the voice signal obtained by converting the voice data or a prescribed call, a voice input means for generating the voice signal in response to a voice inputted from outside, and a response detecting means for detecting a response to a call reception, wherein the first call reception processing means, when receiving the first call reception processing, controls the voice output means to output the voice signal obtained by converting the voice data taken out of the packet transmitted from voice communication apparatus on the call request side via the network. The second call reception processing means controls the voice output means to output the call when receiving the second call reception processing. This second call reception processing means outputs the voice signal obtained by converting the voice data extracted from the packet transmitted from the voice communication apparatus on the call request side via the network when a response to the call reception is detected. It also controls the voice input means to generate a voice signal to be converted into the voice data and, encapsulated in the prescribed packet, to be transmitted to the voice communication apparatus on the call request side via the network.

Preferably, the apparatus should further have a call generating means for generating a prescribed call, wherein the converting means has a first D/A converting means for converting voice data transmitted in the first call reception processing into a first voice signal, and a second D/A converting means for converting voice data transmitted in the second call reception processing into a second voice signal. The voice output means includes a first voice output apparatus for outputting the first voice signal or the second voice signal or a prescribed call, and a second voice output apparatus for outputting the second voice signal. The first call reception processing means, when receiving the first call reception processing, controls the call generating means to cause a call to be generated and controls the first D/A converting means to cause the voice data to be converted into a first voice signal. The second call reception processing means, when receiving the second call reception processing, controls the call generating means to cause a call to be generated and controls the second D/A converting means to cause the voice data to be converted into a second voice signal. The first voice output apparatus, when the first voice signal is supplied from the first D/A converting means, outputs in response to the prescribed call the first voice signal that is supplied, and the first voice output apparatus or second voice output apparatus, when the second voice signal is supplied from the second D/A converting means, outputs the prescribed call and the second voice signal.

Preferably, the call generating means should issue a ringer sound, and the first voice output apparatus, when the first voice signal is supplied from the first D/A converting means, should output in response to the ringer sound the first voice signal that is supplied.

Preferably, the network and the voice communication apparatuses should carry out voice communication by a VoIP (Voice over Internet Protocol) system.

Preferably, the first call request processing should be a call request processing of a multicast call by which the same voice signal is transmitted to each of one or more other voice communication apparatuses. The second call request processing should be a call request processing of a one-to-one call of transmitting voice signals in two ways to and from some of other voice communication apparatuses. The first call reception processing should be a call reception processing of the multicast call; and the second call request processing should be a call reception processing of the one-to-one call.

[Description of Voice Communication Apparatus]

A voice communication apparatus pertaining to the invention will be described referring to an example.

The example cited below is intended only to facilitate understanding by expressing the invention in a more specific manner, but does not limit the technical scope of the invention.

The voice communication apparatus pertaining to the invention, connected to a network such as the Internet or the Ethernet (registered trademark of Xerox corporation), carries out voice communication using the so-called VoIP system by converting voice signals into a digital form, compressing the digital data and encapsulating them into an IP packet.

This system enables a one-to-one call initiating a call to a single terminal (second call request processing) as in usual telephone communication and a multicast call initiating a call from a single terminal to a plurality of (one or more) terminals at the same time (first call request processing).

In a multicast call, the network carries out call reception processing of the multicast call (first call request processing) for each of the plurality of terminal apparatuses designated by the terminal on the call request side as the call destinations, and transmits in a single direction the voice data encapsulated in the IP packet as stated above from the terminal on the call request side to the terminal on the call reception side.

In a one-to-one call, the network carries out call reception processing of the one-to-one call (second call request processing) for a single terminal apparatus designated by the terminal on the call request side as the call destination, and transmits in two directions the voice data encapsulated in the IP packet as stated above between the terminal on the call request side and the terminal on the call reception side.

The constituent part for controlling multicast calls (first call reception processing means) at the terminal on the call reception side, when a multicast call is requested, controls the constituent parts of the terminal apparatus to output from a loudspeaker or the like provided on the terminal the voice data transmitted from the terminal on the call request side irrespective of whether the user's telephone is taken on/off hook.

The constituent part for controlling one-to-one calls (second call reception processing means) at the terminal on the call reception side, when a one-to-one call is requested, performs similar processing to conventional telephone processing.

That is, the constituent part for controlling one-to-one calls, upon receiving a call reception, first outputs a call, and after the user responds to it, controls the constituent parts of the terminal apparatus so that two-way voice transmission can take place between the terminal on the call request side and the terminal on the call reception side.

In this way, when a multicast call is requested, it is possible to effectively carry out, for instance, communication in an emergency by promptly issuing a relatively loud outputting voice from the loudspeaker without waiting for the user's response.

[Voice Output Apparatus]

A voice output apparatus pertaining to the invention is a first voice output apparatus in any of the aforementioned voice communication apparatuses.

In the voice output apparatus pertaining to the present invention network, each of the voice communication apparatuses connected to a network performs first call request processing directed to one or more of the other voice communication apparatuses or second call request processing directed to some of the other voice communication apparatuses; the network performs, in response to the first call request processing, first call reception processing for one or more of the other voice communication apparatuses or, in response to second call request processing, the second call reception processing for some of the other voice communication apparatuses; and transmits a voice signal from the voice communication apparatus on the call request side to each of the voice communication apparatuses having responded to the first call reception processing or the second call reception processing; the voice output apparatus outputting the voice signal from the voice communication apparatus on the call request side when receiving the first call reception processing and notifying of the call reception when receiving the second call reception processing, and after receiving a response to the call reception, outputting the voice signal from the voice communication apparatus on the call request side.

[Program]

A program pertaining to the invention is a program for voice communication apparatuses connected to a network and each including a computer, wherein each of the voice communication apparatuses performs first call request processing directed to one or more of the other voice communication apparatuses or second call request processing directed to some of the other voice communication apparatuses; the network performs, in response to first call request processing, first call reception processing for one or more of the other voice communication apparatuses or, in response to the second call request-processing, second call reception processing for some of the other voice communication apparatuses; and transmits a voice signal from the voice communication apparatus on the call request side to each of the voice communication apparatuses having responded to the first call reception processing or the second call reception processing; the computer is caused to execute the first call reception processing step to output, when the first call reception processing is received, the voice signal from the voice communication apparatus on the call request side, and the second call reception processing step to notify of a call reception when the second call reception processing is received, and after receiving a response to the call reception, to output the voice signal from the voice communication apparatus on the call request side.

DETAILED DESCRIPTION OF THE INVENTION

Modes of carrying out the present invention are described below.

[VoIP Communication System 1]

Figure 1:
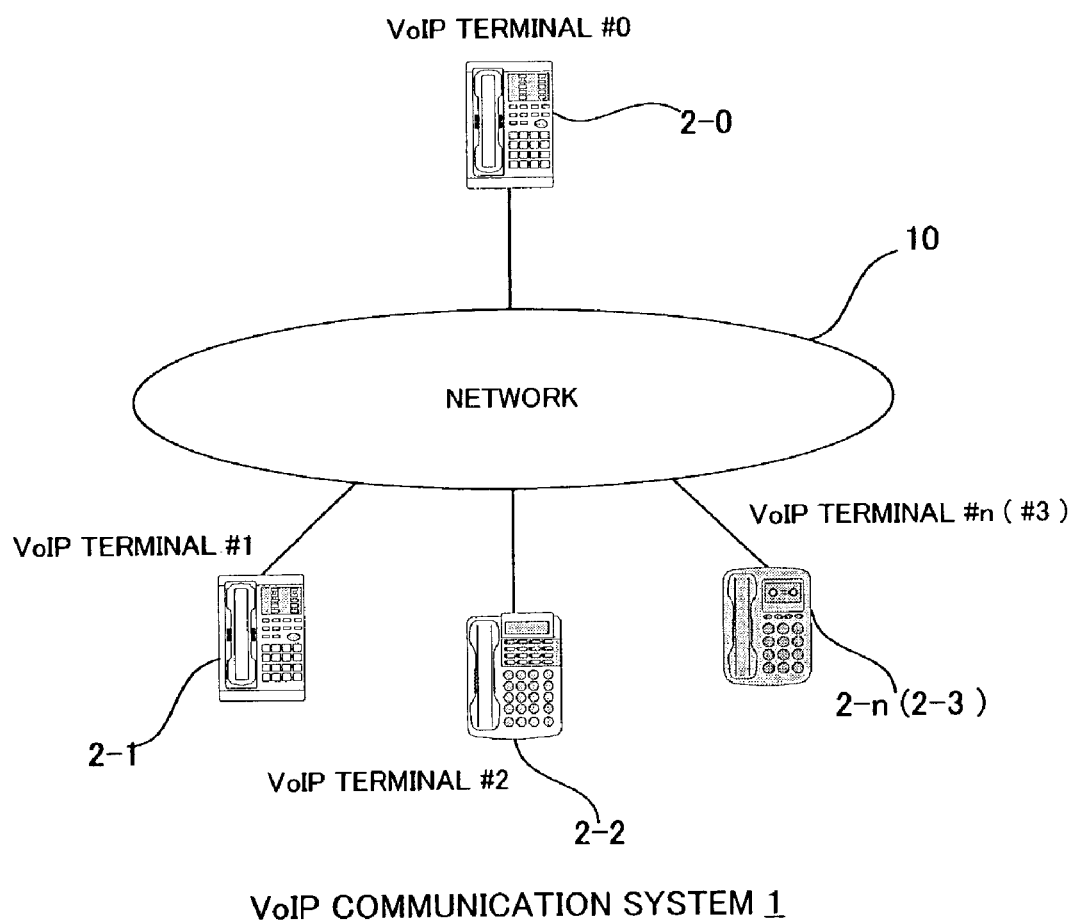
FIG. 1 is a diagram illustrating an example of the configuration of a VoIP (Voice over Internet Protocol) communication system to which a voice communication method pertaining to the present invention is adapted.

FIG. 1 is a diagram illustrating an example of the configuration of a VoIP (Voice over Internet Protocol) communication system 1 to which a voice communication method pertaining to the present invention is adapted.

As shown in FIG. 1, the VoIP communication system 1 is configured of n+1 VoIP terminals #0 through #n (2-0 through 2-n; FIG. 1 shows an example in which n=3), which are connected to be mutually communicable via a network 10 such as the Internet or the Ethernet.

In the VoIP communication system 1, so-called VoIP voice communication is accomplished by such functions as RTP (Real Time Transfer Protocol) for voice communication and H.323, H.243, SIP (Session Initiation Protocol) for voice communication between terminals provided by VoIP terminals 2-0 through 2-n and the network 10.

In other words, in the VoIP communication system 1, voice signals are converted into digital form, compressed and encapsulated into an IP packet, transmitted between the VoIP terminals 2 to perform two-way or one-way communication.

In the following description, a plurality of constituent parts, such as "the VoIP terminals 2-0 through 2-n", are referred to as "the VoIP terminals 2" without identifying any particular one.

[Hardware of VoIP Terminals 2]

Figure 2:
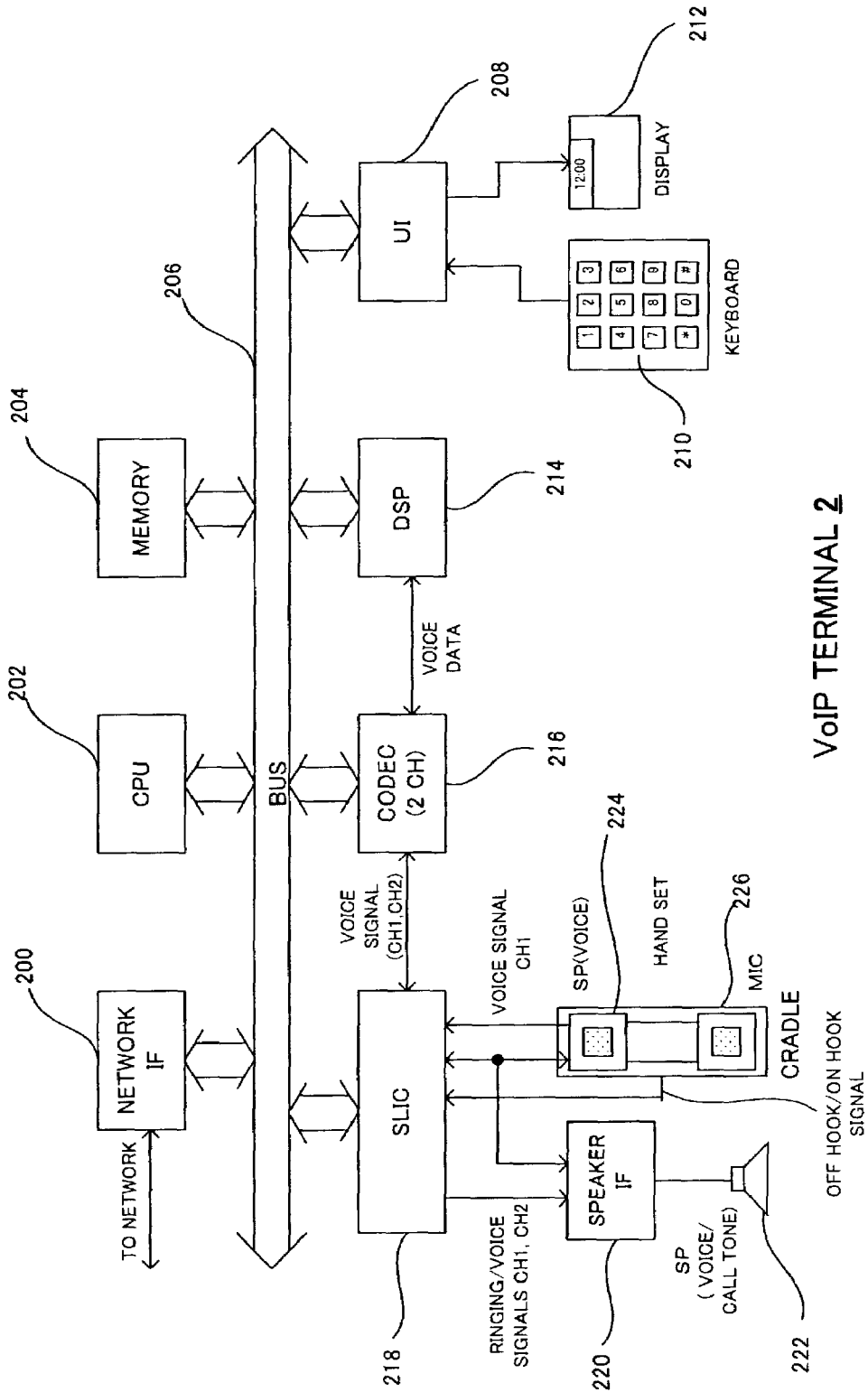
FIG. 2 is a diagram illustrating the hardware configuration of the VoIP terminal shown in FIG. 1.

FIG. 2 is a diagram illustrating the hardware configuration of the VoIP terminal 2 shown in FIG. 1.

As shown in FIG. 2, the VoIP terminal 2 is configured by connecting, via a bus 206, a network interface (network IF) 200, a CPU 202, a memory 204, a user interface (UI) 208 including a keyboard 210 and a display 212 such as an LCD, a digital signal processor (DSP) 214, a CODEC 216 including two A/D converting circuits and two D/A converting circuits (neither shown in FIG. 2) and an SLIC (Subscriber Line Interface Circuit) 218.

A loudspeaker (SP) 222 is connected to the SLIC 218 via a loudspeaker IF 220 (first voice output apparatus).

To the SLIC 218 also are connected a hand set 224 (second voice output apparatus) including a loudspeaker and a microphone and a cradle 226, on which the hand set 224 is placed, to detect whether it is off or on the hook.

In other words, the VoIP terminal 2 contains constituent parts of a digital hand set for carrying out voice communication by the VoIP system via the network 10.

The network IF 200 provides an interfacing function for data transmission and reception between the network 10 and other constituent parts of the VoIP terminal 2.

The CPU 202 executes a VoIP terminal program 24 (to be described afterwards with reference to FIG. 3) provided to the memory 204 in a state in which, for instance, it is written to ROM, and controls the constituent parts of the VoIP terminal 2 to provide a voice communication method pertaining to the invention.

The DSP 214 extracts compressed voice data from an IP packet inputted from the network 10 via the network IF 200 and the bus 206, extends then outputs the extended data to the CODEC 216.

Also, the DSP 214 compresses uncompressed voice data inputted via the SLIC 218 and the CODEC 216, encapsulates the compressed voice data into an IP packet, and outputs the packet to the network 10 via the bus 206 and the network IF 200.

Of the two A/D circuits ch1 and ch2 contained in the CODEC 216, the A/D circuit ch1 transmits voice data in two ways between two VoIP terminals 2 in a one-to-one call of voice communication, converts a voice signal ch1 inputted from the SLIC 218 into uncompressed voice data in digital form, and outputs the digital data to the DSP 214.

At the VoIP terminal 2 on the initiating side of a multicast call for performing voice communication by transmitting in one way the same voice data to a plurality of (one or more) other VoIP terminals, the A/D circuit ch2 converts a voice signal ch2 inputted from the SLIC 218 in one VoIP terminal 2 into voice data ch1 in digital form, and outputs the digital data to the DSP 214.

Of the two D/A circuits ch1 and ch2 contained in the CODEC 216, the D/A circuit ch1 converts uncompressed voice data inputted from the DSP 214 in a one-to-one call of voice communication into a voice signal ch1 in analog form, and outputs the signal to the SLIC 218.

The D/A circuit ch2, at the VoIP terminal 2 on the arriving side of the multicast call, converts a voice signal ch2 inputted from the DSP 214 into uncompressed voice data ch2 in digital form, and outputs the data to the SLIC 218.

[SLIC 218]

When the user has picked up the hand set 224 placed in the cradle 226, the SLIC 218 detects the change of the VoIP terminal 2 from the on-hook to the off-hook state and, when the user has placed the hand set 224 in the cradle 226, the SLIC 218 detects the change of the VoIP terminal 2 from the off-hook to the on-hook state.

However, if the user performs a prescribed operation on the display 212, the CPU 202 will also detect a change between the on-hook and off-hook states.

When a one-to-one call is requested, the SLIC 218 outputs a call tone signal (which may be the same as a ringing signal to be described later) via the loudspeaker IF 220.

When the VoIP terminal 2 changes to the off-hook state, the SLIC 218 outputs, in accordance with an operation by the user, a voice signal ch1 inputted from the CODEC 216 from the loudspeaker IF 220 or the loudspeaker of the hand set 224.

Also, the SLIC 218 converts a voice inputted from the hand set 224 in a one-to-one call into an electric voice signal, and outputs it to the CODEC 216 as a voice signal ch1.

Also the SLIC 218, at the VoIP terminal 2 on the initiating side of a multicast call, outputs a voice signal inputted from the hand set 224 to the CODEC 216 as a voice signal ch2.

Also the SLIC 218, at the VoIP terminal 2 on the arriving side of the multicast call, brings the terminal into an off-hook state by sending a ringing signal to the loudspeaker IF 220, and further outputs a voice signal ch2, inputted from the CODEC 216, from the loudspeaker 222 via the loudspeaker IF 220.

[Loudspeaker IF 220]

In a one-to-one call, the loudspeaker IF 220 outputs a call tone signal (ringing signal) and a voice signal ch1, inputted from the SLIC 218, from the loudspeaker 222.

Also, in a multicast call, the loudspeaker IF 220 enters an off-hook state when it receives a ringing signal from the SLIC 218, and outputs a voice signal ch2, inputted from the SLIC 218 following the ringing signal, from the loudspeaker 222.

[Software of VoIP Terminal 2]

Figure 3:
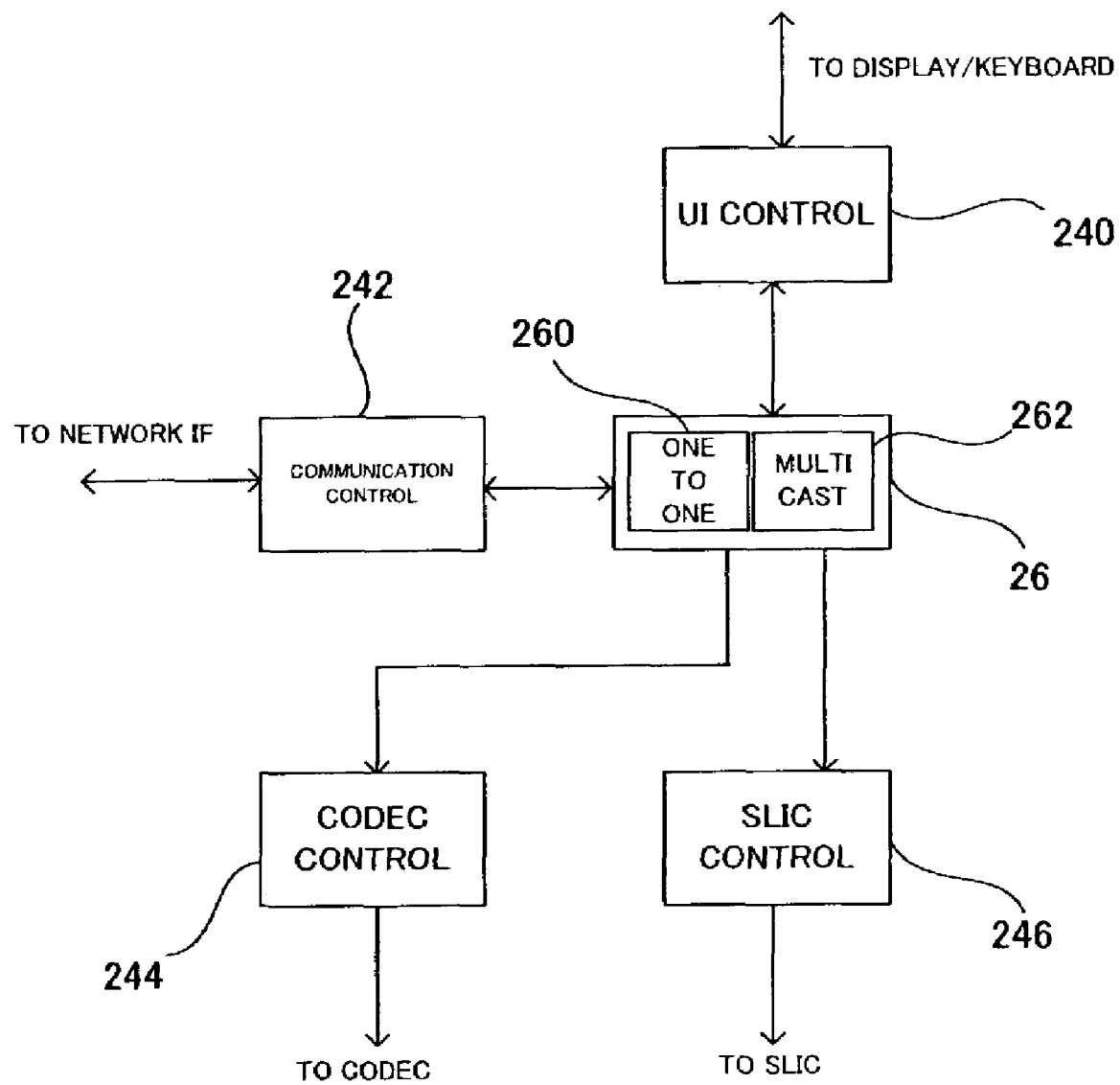
FIG. 3 is a diagram illustrating the configuration of a VoIP terminal program to implement the voice communication method pertaining to the invention.

FIG. 3 is a diagram illustrating the configuration of the VoIP terminal program 24 to implement the voice communication method pertaining to the invention.

As shown in FIG. 3, the VoIP terminal program 24 is configured of a UI control section 240, a communication control section 242, a CODEC control section 244, an SLIC control section 246 and a call control section 26, and the call control section 26 comprises a one-to-one call control section 260 (second call reception processing means) and a multicast call control section 262 (first call reception processing means).

The UI control section 240 accepts any change in the on/off-hook state detected by the SLIC 218 and the user's operation of the keyboard 210 for outputting to the call control section 26.

The communication control section 242 controls the network IF 200 and other elements to accomplish necessary communication controls for the VoIP communication.

The CODEC control section 244 and the SLIC control section 246 control the operations of the aforementioned CODEC 216 and SLIC 218, respectively.

[One-to-One Call Control Section 260]

In the call control section 26, the one-to-one call control section 260 controls the operation that is done when the VoIP terminal 2 makes a one-to-one call.

Thus the one-to-one call control section 260, when it has received a one-to-one call arriving from another VoIP terminal 2 via the network 10, outputs a call tone signal (ringing signal) from the loudspeaker 222 via the loudspeaker IF 220.

When the user manipulates to respond, the one-to-one call control section 260 controls the constituent parts of the VoIP terminal 2 (FIG. 2) via the CODEC control section 244, the SLIC control section 246 and the like to generate a voice signal ch1 from the voice inputted from the hand set 224, convert it into voice data ch1, compress it, encapsulate it into an IP packet and transmit the packet to the network 10.

Also, when the user manipulates to respond, the one-to-one call control section 260 controls the constituent parts of the VoIP terminal 2 via the CODEC control section 244, the SLIC control section 246 and the like to extract the compressed voice data from the IP packet the network 10 has received, extend it into voice data ch1, and output it as a voice signal ch1 from the loudspeaker 222 or the loudspeaker of the hand set 224.

[Multicast Call Control Section 262]

The multicast call control section 262 controls the operation that is done by the VoIP terminal 2 when it makes a multicast call.

Thus, in the VoIP terminal 2 on the call initiating side, the multicast call control section 262 controls the constituent parts of the VoIP terminal 2 (FIG. 2) via the CODEC control section 244, the SLIC control section 246 and the like to generate a voice signal ch2 from a voice inputted from the hand set 224, convert it into voice data ch2, compress it, encapsulate it into an IP packet and transmit the packet to the network 10.

When a multicast call is requested at the VoIP terminal 2 on the call reception side, the multicast call control section 262 controls the SLIC 218 to cause a ringing signal to be sent out to the loudspeaker IF 220.

Upon detecting this ringing signal, the loudspeaker IF 220 enters an off-hook state.

Further, the multicast call control section 262 controls the constituent parts of the VoIP terminal 2 via the CODEC control section 244 and the SLIC control section 246 and the like to extract compressed voice data from the IP packet received from the network 10, extend it into voice data ch2 and output it from the loudspeaker 222 as a voice signal ch2.

[Operations of VoIP Terminal 2]

Next will be described the overall operations of the VoIP terminal 2 (the VoIP terminal program 24).

Figure 4:
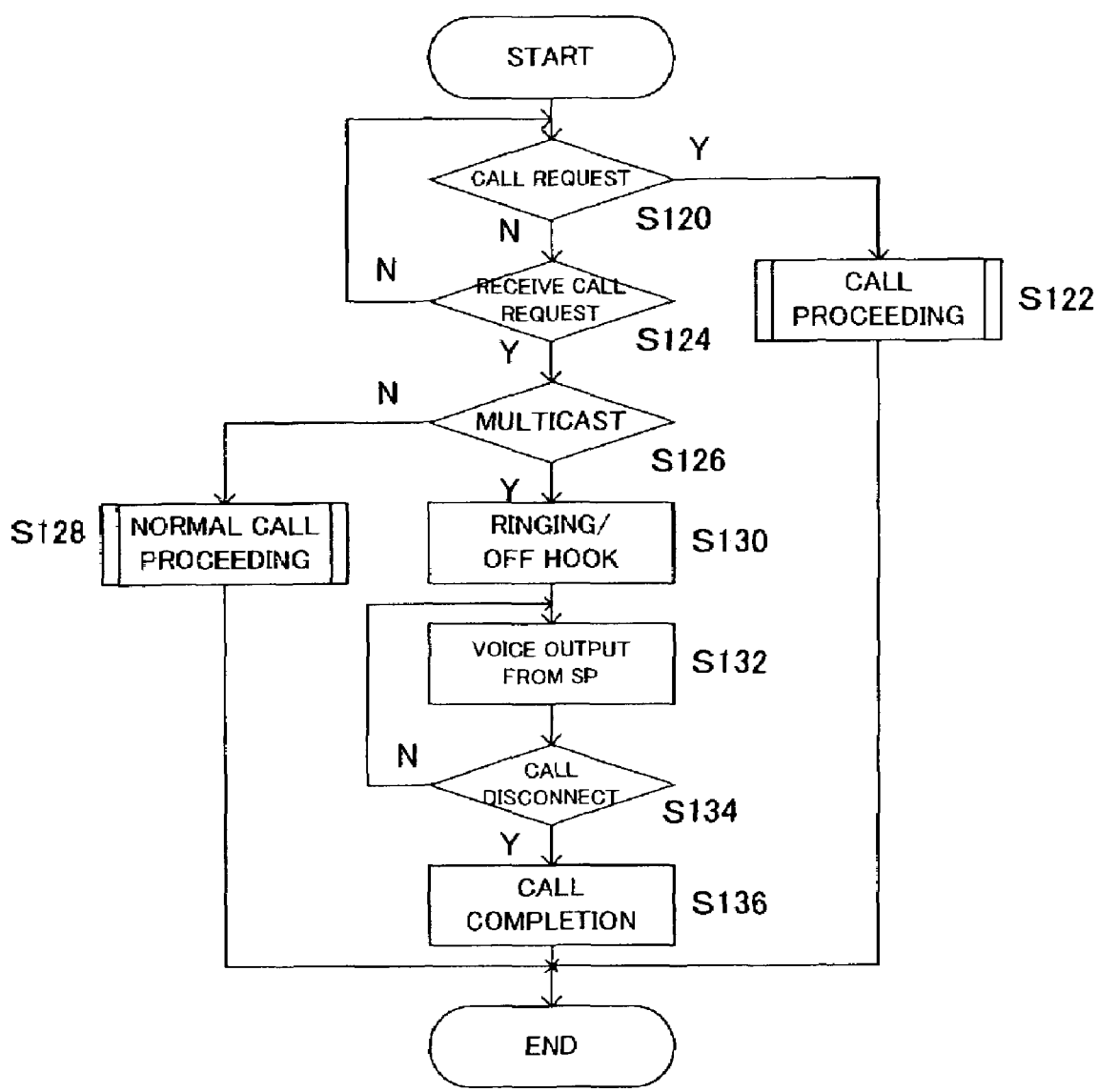
FIG. 4 is a flowchart showing the operation (S12) of the VoIP terminal (VoIP terminal program).

FIG. 4 is a flowchart showing the operation (S12) of the VoIP terminal 2 (the VoIP terminal program 24).

As shown in FIG. 4, at step 120 (S120), the communication control section 242 (FIG. 3) of the VoIP terminal program 24 determines whether the user has taken the hand set 224 off the hook and has further manipulated the keyboard 210 (FIG. 2) of the VoIP terminal 2 to initiate a call to another VoIP terminal 2.

The VoIP terminal program 24, if there has been a manipulation for call request, moves ahead to the processing at S122, or if not, moves ahead to the processing at S124.

At step 122 (S122), the VoIP terminal program 24, according to a manipulation by the user, proceeds call request for a one-to-one call or a multicast call and further, according to a manipulation by the user or a demand from the network 10 side, processes call disconnection.

At step 124 (S124), the VoIP terminal program 24 determines whether there has been a call reception from another VoIP terminal 2 via the network 10.

The VoIP terminal program 24, if there has been a call reception, moves ahead to the processing at S126, or if not, returns to the processing at S120.

At step 126 (S126), the communication control section 242 of the VoIP terminal program 24 determines whether the call that has been requested is a one-to-one call or a multicast call.

The VoIP terminal program 24, if the call that has been requested is a multicast call, moves ahead to the normal call proceeding at S128, or if not, moves ahead to the call proceeding at S130.

At step 128 (S128), the one-to-one call control section 260 performs the above-described proceeding for a one-to-one call (normal call reception) and further, according to a manipulation by the user or a demand from the network 10 side, processes call disconnection.

At step 130 (S130), the multicast call control section 262 controls the SLIC 218 to cause a ringing signal to be sent out to the loudspeaker IF 220.

Upon detecting this ringing signal, the loudspeaker IF 220 enters an off-hook state.

At step 132 (S132), when the multicast call control section 262 receives the ringing signal, the loudspeaker IF 220 outputs a voice signal ch2 inputted from the SLIC 218.

At step 132 (S132), the communication control section 242 determines whether the user has done a manipulation for call disconnection or whether or not there has been a demand for call disconnection from the network 10 side.

The VoIP terminal program 24, if there has been one of these, moves ahead to the processing at S136, or if there has been neither, continues the outputting of the voice signal ch2 at S132.

At step 136 (S136), the communication control section 242 processes call disconnection (Call Complition).

[Overall Operations of VoIP Communication System 1]

The overall operations of the VoIP communication system 1 will be described below with reference to a case in which a call is initiated from the VoIP terminal 2-0 to other VoIP terminals 2-1 through 2-3 (FIG. 1).

Figure 5:
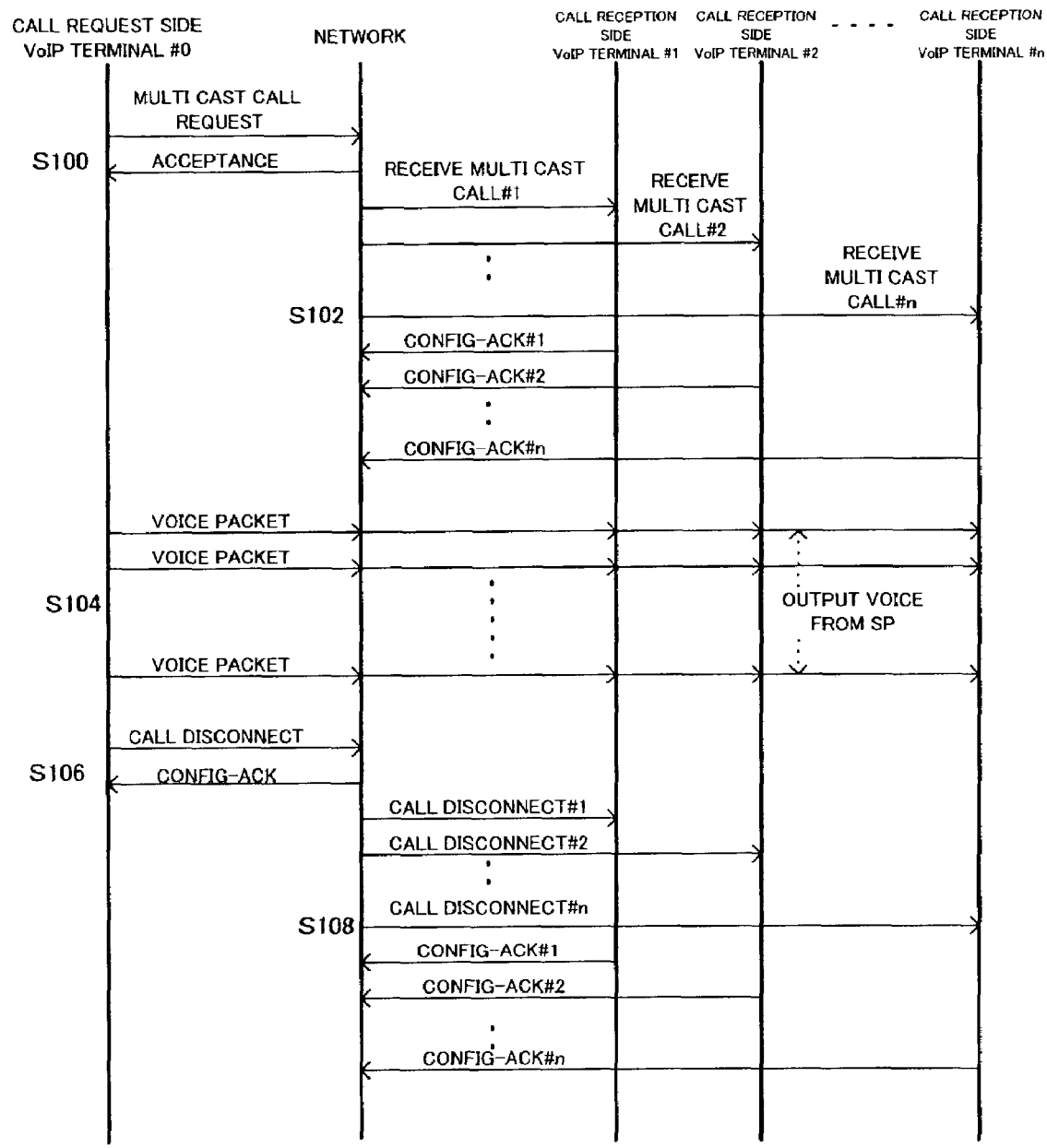
FIG. 5 is a signal sequence diagram of a multicast call (S10) in the VoIP communication system.

FIG. 5 is a signal sequence diagram of a multicast call (S10) in the VoIP communication system 1.

Figure 6:
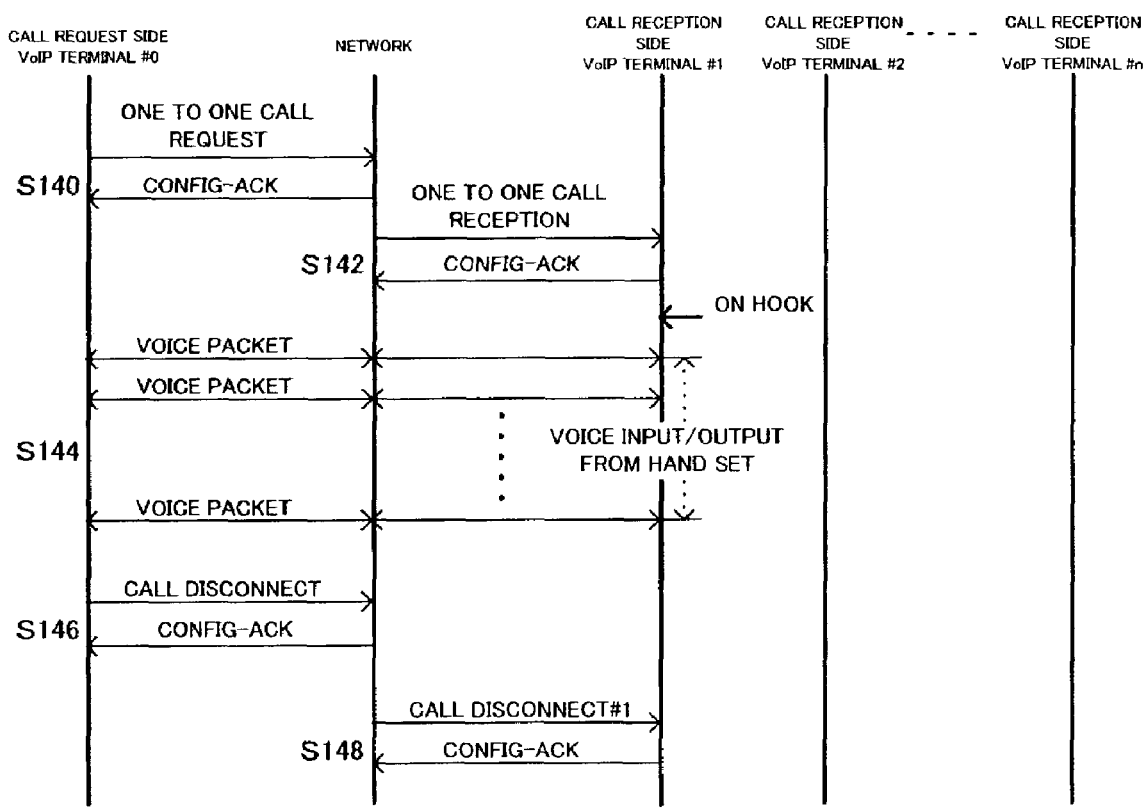
FIG. 6 is a signal sequence diagram of a one-to-one call (S14) in the VoIP communication system.

FIG. 6 is a signal sequence diagram of a one-to-one call (S14) in the VoIP communication system 1.

[Multicast Call]

First will be described the overall operations of the VoIP communication system 1 in making a multicast call.

As shown in FIG. 5, when the communication control section 242 (FIG. 3) of the VoIP terminal 2-0 (FIG. 1), according to a manipulation by the user, sends out a signal for multicast call request (Config-ACK) to, for instance, the VoIP terminals 2-1 through 2-3, the network 100 returns a signal indicating the acceptance (ACK) of this call request to the VoIP terminal 2-0 (S100).

When the network 10 sends out a signal for the arrival of a multicast call to each of the VoIP terminals 2-1 through 2-3, each of the communication control sections 242 of the VoIP terminals 2-1 through 2-3 returns a signal indicating the acceptance of the call reception (Config-ACK) to the network 10 (S102).

Each of the multicast call control sections 262 (FIG. 3) of the VoIP terminals 2-1 through 2-3 performs the above-described multicast call processing, and the IP packet for encapsulating voice data from the VoIP terminal 2-0 is transmitted in one way to the VoIP terminals 2-1 through 2-3.

The voice data is taken out of the IP packet at each of the VoIP terminals 2-1 through 2-3 and converted into a voice signal ch2, which is outputted from the loudspeaker 222 (FIG. 2) (S104).

When the user of the VoIP terminal 2-0 manipulates for call disconnection by, for instance, placing the hand set 224 (FIG. 2) on the cradle 226, the communication control section 242 of the VoIP terminal 2-0 sends out a signal for call disconnection to the network 10, and processes call disconnection.

In response, the network 10 returns a signal indicating the acceptance of the signal for call disconnection to the VoIP terminal 2-0 (S106).

The network 10 sends out the signal for call disconnection to each of the VoIP terminals 2-1 through 2-3, and each of the communication control sections 242 of the VoIP terminals 2-1 through 2-3 returns a signal indicating the acceptance of call disconnection (Config-ACK) to the network 10, and processes call disconnection (S108).

[One-to-One Call]

Next will be described the overall operations of the VoIP communication system 1 in making a one-to-one call.

As shown in FIG. 6, when the communication control section 242 (FIG. 3) of the VoIP terminal 2-0 (FIG. 1), according to manipulation by the user, sends out a signal for one-to-one call request to, for instance, the VoIP terminal 2-1, the network 100 returns a signal indicating the acceptance of this call request (Config-ACK) to the VoIP terminal 2-0 (S140).

When the network 10 sends out a signal for the arrival of a one-to-one call to the VoIP terminal 2-1, the communication control section 242 of the VoIP terminal 2-1 returns a signal indicating the acceptance of the call reception (Config-ACK) to the network 10 (S142).

The one-to-one call control section 260 (FIG. 3) of the VoIP terminal 2-1 performs the above-described one-to-one call processing, and an IP packet encapsulating voice data from the VoIP terminal 2-0 is transmitted in two ways between it and the VoIP terminal 2-1.

When the user of the VoIP terminal 2-1 takes it off the hook by, for instance, picking up the hand set 224, the voice data is taken out of the IP packet and converted into a voice signal ch1, which is outputted from the loudspeaker of the hand set 224 or the loudspeaker 222 (FIG. 2) (S144).

When the user of the VoIP terminal 2-0 does a manipulation for call disconnection by, for instance, placing the hand set 224 (FIG. 2) on the cradle 226, the communication control section 242 of the VoIP terminal 2-0 sends out a signal for call disconnection to the network 10, and processes call disconnection.

In response, the network 10 returns a signal indicating the acceptance of the signal for call disconnection (Config-ACK) to the VoIP terminal 2-0 (S146).

The network 10 sends out the signal for call disconnection to the VoIP terminal 2-1, and the communication control section 242 of the VoIP terminal 2-1 returns a signal indicating the acceptance of call disconnection to (Config-ACK) the network 10 and processes call disconnection (S148).

As hitherto described, the voice communication system and its method pertaining to the present invention make it possible to respond to a call reception utilizing the characteristics of the VoIP multicast call system.

INDUSTRIAL APPLICABILITY

The voice communication system and its method pertaining to the invention can be used in a communication apparatus for performing voice communication via the Internet.

What is claimed is:

1. A voice communication apparatus connected to a network, wherein;
the voice communication apparatus performs first call request processing directed to one or more of the other voice communication apparatuses or second call request processing directed to some of the other voice communication apparatuses;
the network, in response to the first call request processing, performs the first call reception processing for one or more of the other voice communication apparatuses or, in response to the second call request processing, performs the second call reception processing for some of the other voice communication apparatuses, and transmits a voice signal from the voice communication apparatus on the call request side to each of the voice communication apparatuses having responded to the first call reception processing or the second call reception processing;

the voice communication apparatus, comprises:

first call reception processing means for outputting the voice signal from the voice communication apparatus on the call request side when receiving the first call reception processing, and second call reception processing means for notification of call reception when receiving the second call reception processing and, after receiving a response to the call reception, outputting the voice signal from the voice communication apparatus on the call request side;

packet processing means for accommodating voice data obtained by converting a voice signal into a prescribed packet, transmitting it via the network, and taking out the voice data from the prescribed packet transmitted via the network, converting means for converting a voice signal into the voice data and converting the voice data extracted from the prescribed packet into a voice signal, voice output means for outputting the voice signal obtained by converting the voice data or a prescribed call, voice input means for generating the voice signal in response to a voice inputted from outside, and response detecting means for detecting a response to a call reception, wherein, the first call reception processing means, when receiving the first call reception processing, controls the voice output means to output the voice signal obtained by converting the voice data extracted from the packet transmitted from the voice communication apparatus on the call request side via the network, and the second call reception processing means controls the voice output means to output the call when receiving the second call reception processing; outputs the voice signal obtained by converting the voice data extracted from the packet transmitted from the voice communication apparatus on the call request side via the network when a response to the call reception is detected; and controls the voice input means to generate a voice signal to be converted into the voice data and, accommodated in the prescribed packet, to be transmitted to the voice communication apparatus on the call request side via the network;

the voice communication apparatuses, each further having call generating means for generating a prescribed call, the converting means has:

first D/A converting means for converting voice data transmitted in the first call reception processing into a first voice signal, and second D/A converting means for converting voice data transmitted in the second call reception processing into a second voice signal, the voice output means includes:

a first voice output apparatus for outputting the first voice signal or second voice signal or a prescribed call, and a second voice output apparatus for outputting the second voice signal, the first call reception processing means, when receiving the first call reception processing, controls the call generating means to cause a call to be generated and controls the first D/A converting means to cause the voice data to be converted into a first voice signal, the second call reception processing means, when receiving the second call reception processing, controls the call generating means to cause a call to be generated and controls the second D/A converting means to cause the voice data to be converted into a second voice signal, the first voice output apparatus, when the first voice signal is supplied from the first D/A converting means, outputs in response to the prescribed call the first voice signal that is supplied, and the first voice output apparatus or second voice output apparatus, when the second voice signal is supplied from the second D/A converting means, outputs the prescribed call and the second voice signal.

2. The voice communication apparatus according to claim 1, wherein, the call generating means issues a ringer sound, and the first voice output apparatus, when the first voice signal is supplied from the first D/A converting means, outputs in response to the ringer sound the first voice signal that is supplied.

3. The voice communication apparatus according to claim 1, wherein, the network and the voice communication apparatuses carry out voice communication by the VoIP (Voice over Internet Protocol) system.

4. The voice communication apparatus according to claim 3, wherein, the first call request processing is call request processing of a multicast call by which the same voice signal is transmitted to each of one or more other voice communication apparatuses, the second call request processing is call request processing of a one-to-one call of transmitting voice signals in two ways, to and from some of the other voice communication apparatuses, the first call reception processing is call reception processing of the multicast call, and the second call request processing is call reception processing of the one-to-one call.

5. A voice communication system comprising a network and a plurality of voice communication apparatuses connected to the network, wherein each of said voice communication apparatuses comprises a voice communication apparatus according to claim 1, and said voice communication system is adapted for operation in which:

each of the plurality of voice communication apparatuses performs first call request processing directed to one or more of the other voice communication apparatuses or second call request processing directed to some of the other voice communication apparatuses;

the network performs, in response to the first call request processing, first call reception processing for one or more of the other voice communication apparatuses or, in response to the second call request processing, second call reception processing for some of the other voice communication apparatuses, and transmits a voice signal from the voice communication apparatus on the call request side to each of the voice communication apparatuses having responded to the first call reception processing or the second call reception processing;

and each of the voice communication apparatuses receiving the first call reception processing outputs the voice signal from the voice communication apparatus on the call request side when receiving the first call reception processing, is notified of the call reception when receiving the second call reception processing, and after receiving a response to the call reception, outputs the voice signal from the voice communication apparatus on the call request side.

6. A voice communication method for voice communication apparatuses connected to a network, comprising:

providing a voice communication apparatus according to claim 1; and operating said voice communication apparatus whereby:

each of the voice communication apparatuses performs first call request processing directed to one or more of the other voice communication apparatuses or second call request processing directed to some of the other voice communication apparatuses;

the network performs, in response to the first call request processing, the first call reception processing for one or more of the other voice communication apparatuses or, in response to the second call request processing, the second call reception processing for some of the other voice communication apparatuses; and transmits a voice signal from the voice communication apparatus on the call request side to each of the voice communication apparatuses having responded to the first call reception processing or the second call reception processing;

the voice signal from the voice communication apparatus on the call request side is outputted when receiving the first call reception processing; and the call reception is notified when receiving the second call reception processing, and after a response to the call reception is received, the voice signal from the voice communication.

7. A computer readable medium encoded with a computer program for the voice communication apparatus connected to a network according to claim 1, wherein the voice communication apparatus includes a computer arranged to execute the computer program to cause the voice communication apparatus to carry out a method wherein: each of the voice communication apparatuses performs first call request processing directed to one or more of the other voice communication apparatuses or second call request processing directed to some of the other voice communication apparatuses; the network performs, in response to the first call request processing, the first call reception processing for one or more of the other voice communication apparatuses or, in response to the second call request processing, the second call reception processing for some of the other voice communication apparatuses;

and transmits a voice signal from the voice communication apparatus on the call request side to each of the voice communication apparatuses which responded to the first call reception processing or the second call reception processing;

the computer is caused to execute: a first call reception processing step to output, when the first call reception processing is received, the voice signal from the voice communication apparatus on the call request side, and a second call reception processing step to notify of a call reception when the second call reception processing is received, and after receiving a response to the call reception, to output the voice signal from the voice communication apparatus on the call request side.

* * * * *

UNITED STATES PATENT AND TRADEMARK OFFICE
CERTIFICATE OF CORRECTION

| | | |
|---|---|---|
| PATENT NO. | : 7,310,328 B2 | Page 1 of 1 |
| APPLICATION NO. | : 10/370601 | |
| DATED | : December 18, 2007 | |
| INVENTOR(S) | : Noriyasu Katoh | |

It is certified that error appears in the above-identified patent and that said Letters Patent is hereby corrected as shown below:

Column 13, line 31 (claim 6): "voice communication." should be -- voice communication apparatus on the call request side is outputted --.

Signed and Sealed this

Fifteenth Day of April, 2008

JON W. DUDAS
*Director of the United States Patent and Trademark Office*